(12) United States Patent
Lin et al.

(10) Patent No.: US 8,340,431 B2
(45) Date of Patent: Dec. 25, 2012

(54) AUTOMATIC PHOTOGRAPHING METHOD WITH FACE RECOGNITION

(75) Inventors: Tzu-Chih Lin, Cyonglin Township (TW); Huan-Chun Lo, Toufen Township (TW)

(73) Assignee: Altek Corporation, Hsinchu (TW)

( * ) Notice: Subject to any disclaimer, the term of this patent is extended or adjusted under 35 U.S.C. 154(b) by 1076 days.

(21) Appl. No.: 12/271,330

(22) Filed: Nov. 14, 2008

(65) Prior Publication Data

US 2010/0021019 A1 Jan. 28, 2010

(30) Foreign Application Priority Data

Jul. 23, 2008 (TW) ............................. 97127952 A

(51) Int. Cl.
*G06K 9/00* (2006.01)
(52) U.S. Cl. ......... 382/190; 382/286; 348/345; 399/163
(58) Field of Classification Search .................. 382/190, 382/286; 345/348; 399/163
See application file for complete search history.

(56) References Cited

U.S. PATENT DOCUMENTS

| | | | |
|---|---|---|---|
| 6,680,745 B2* | 1/2004 | Center et al. ............... 348/14.16 |
| 6,940,545 B1* | 9/2005 | Ray et al. .................... 348/222.1 |
| 7,039,222 B2* | 5/2006 | Simon et al. ................... 382/118 |
| 2002/0154240 A1* | 10/2002 | Tamai et al. .................... 348/345 |
| 2003/0146997 A1* | 8/2003 | Fredlund et al. .......... 348/333.02 |
| 2005/0254727 A1* | 11/2005 | Fedorovskaya ................ 382/286 |
| 2006/0103754 A1* | 5/2006 | Wenstrand et al. ............ 348/349 |
| 2006/0115297 A1* | 6/2006 | Nakamaru ..................... 399/163 |
| 2006/0126938 A1* | 6/2006 | Lee et al. ........................ 382/190 |
| 2006/0146174 A1* | 7/2006 | Hagino ......................... 348/349 |
| 2008/0204564 A1* | 8/2008 | Yumiki ..................... 348/208.99 |

* cited by examiner

*Primary Examiner* — Hadi Akhavannik
(74) *Attorney, Agent, or Firm* — Workman Nydegger

(57) ABSTRACT

An automatic photographing method with face recognition is applied in a camera having a detecting lens and a photographing lens for a user to photograph a target. First, detect a face of the user through the detecting lens, and obtain a plurality of face images of the detected face. Then, capture an image variance of the obtained face images, and photograph the target through a photographing lens when the captured image variance exceeds a photographing starting value. Therefore, during the whole photographing process, photographing can be achieved through determining variations of the face images of the user without pressing the shutter key of the camera, thereby completely preventing handshakes resulted from the pressing action, and thus improving the photographing quality.

12 Claims, 4 Drawing Sheets

AUTOMATIC PHOTOGRAPHING METHOD WITH FACE RECOGNITION

CROSS-REFERENCE TO RELATED APPLICATIONS

This non-provisional application claims priority under 35 U.S.C. §119(a) on Patent Application No(s). 097127952 filed in Taiwan, R.O.C. on Jul. 23, 2008 the entire contents of which are hereby incorporated by reference.

BACKGROUND

1. Field of Invention

The present invention relates to a photographing method, and more particularly to an automatic photographing method with face recognition.

2. Related Art

Recently, camera users generally take photos in a hand-held manner. As the hand-held press-photographing manner may result in a handshake, the current cameras are usually added with an anti-handshake function.

The anti-handshake function can be classified into optical and electronic types, i.e., two most commonly applied modes in the cameras.

For the optical anti-handshake function, a floating photo-sensitive element or a floating lens is added into a lens system, so as to modify an inclined situation resulted from parallel or perpendicular movements. The floating lens may generate a reverse modification relative to a moving direction of the lens, such that the lens is kept stable and will not produce a fuzzy image due to any shake, thus improving the photographing quality.

For the electronic anti-handshake function, a fuzzy image resulted from any shake is modified by an electronic circuit. In particular, the image affected by the shakes is removed through a pixel operation or an electronic operation configured in the camera, such that the image is modified.

However, the optical and the electronic anti-handshake function both have their limits in function, and may not completely prevent the impact of the handshake. When the shutter speed is slow to a certain degree, any slight shake during the photographing may affect the photographed picture. At this point, even if the camera has various anti-handshake functions, it is still impossible to photograph a perfect image without any shake.

SUMMARY

Accordingly, the present invention is directed to an automatic photographing method with face recognition, so as to solve the problem in the prior art that it is still impossible to completely prevent the handshake impact under the anti-handshake mode of the camera.

An automatic photographing method with face recognition is applied in a camera having a detecting lens and a photographing lens for a user to photograph a target. First, detect a face of the user through the detecting lens, and obtain face images of the detected face. Then, capture an image variance of the obtained face images, and photograph the target through a photographing lens when the captured image variance exceeds a photographing starting value.

Further, a focusing step may be added. The focusing step includes focusing on the target through the photographing lens when the captured image variance exceeds a focusing starting value.

To sum up, in the present invention, the target is focused on through the photographing lens, the face of the user is detected by the detecting lens to obtain continuously the face images, then the image variance is captured according to the face images, and finally when the image variance exceeds the photographing starting value, the target is photographed through the photographing lens. Therefore, during the whole process, it is possible to finish photographing through the image variation of the face images of the user without pressing the shutter key, so as to completely prevent handshakes resulted from the pressing action, and thus improve the photographing quality.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The detailed features and advantages of the present invention will be described in detail in the following embodiments. Those skilled in the arts can easily understand and implement the content of the present invention. Furthermore, the relative objectives and advantages of the present invention are apparent to those skilled in the arts with reference to the content disclosed in the specification, claims, and drawings. The embodiments below are intended to further describe the views of the present invention instead of limiting the scope of the same.

Figure 1:
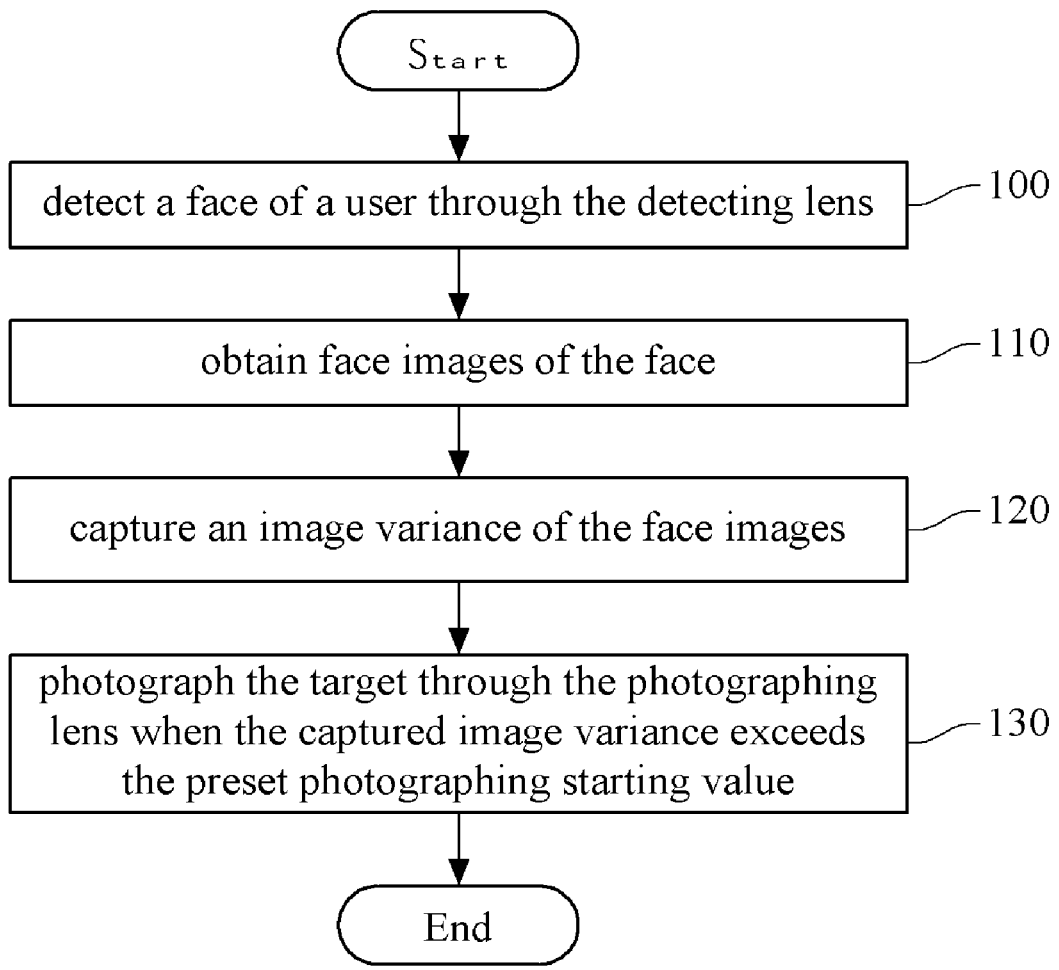
FIG. 1 is a flow chart of an automatic photographing method with face recognition according to an embodiment of the present invention.

FIG. 1 is a flow chart of an automatic photographing method with face recognition according to an embodiment of the present invention. Referring to FIG. 1, the method is applied in a camera having a detecting lens and a photographing lens for a user to photograph a target. First, detect a face of a user through the detecting lens for many times (Step 100). And, obtain continuously face images of the face detected by the detecting lens (Step 110). Then, capture an image variance of the obtained face images (Step 120). Finally, compare the image variance captured with a photographing starting value preset, and photographing the target through the photographing lens when the captured image variance exceeds the preset photographing starting value (Step 130).

The step of obtaining the face image of the face of the user includes obtaining a plurality of pixel units of the face image.

The step of capturing the image variance of the face images includes capturing the image variance of the face images from the plurality of pixel units of each face image. Here, the image variance is obtained by comparing two face images.

In this embodiment, the face of the user is detected through the detecting lens for many times to continuously obtain the face images of the detected face. Then, the image variation of the face images of the user is obtained. Finally, the target is photographed through the photographing lens according to the obtained image variation.

An example is given below for description. The detecting lens detects the face of the user for many times, to obtain continuously face images, hereafter called as a first face image and a second face image. The image variance may be a difference between face images, i.e. the first face image and the second face image, of the face of the user obtained continuously through the detecting lens. In addition, the first face image and the second face image are constituted by a plurality of pixel units, such that the difference on the pixel units between the two face images can be obtained by comparison, so as to acquire the image variance. For example, for a bit mapped (BMP) file format, the image variance can be obtained by comparing the difference of the image data between pixels in the face images of the two BMP files. However, this example is only an exemplary description instead of limiting the implementation aspect of the present invention.

Figure 2:
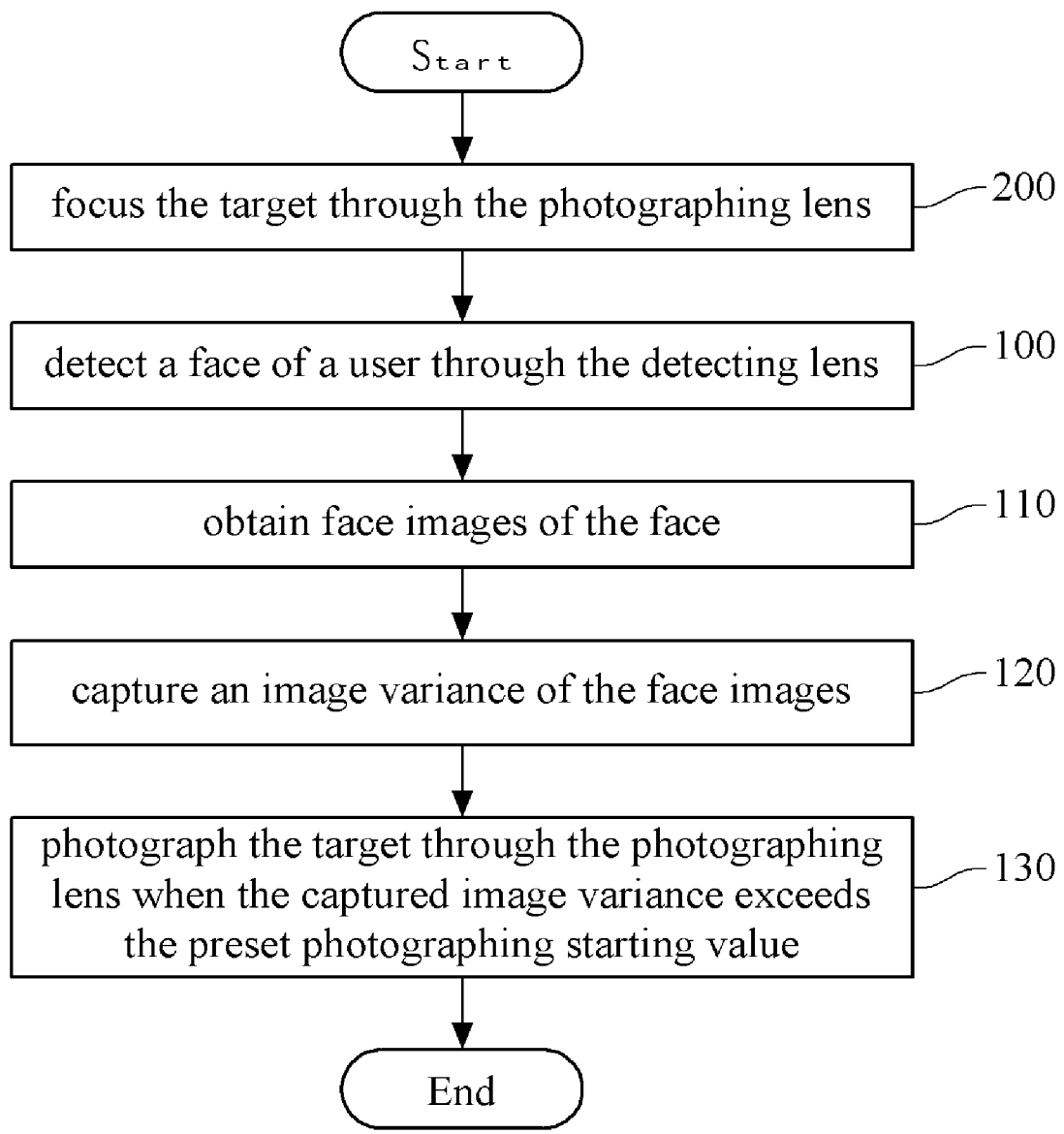
FIG. 2 is a flow chart of an automatic photographing method with face recognition according to an embodiment of the present invention.

FIG. 2 is a flow chart of an automatic photographing method with face recognition according to an embodiment of the present invention. Referring to FIG. 2, in this embodiment, a focusing step is added.

In this embodiment, the method includes focusing the target through the photographing lens (Step 200), detecting the face of the user through the detecting lens for many times (Step 100), obtaining continuously the face images of the face of the user (Step 110), capturing the image variance of the face images (Step 120), and finally photographing the target through the photographing lens when the image variance exceeds the preset photographing starting value (Step 130).

In other words, after the target is focused on through the photographing lens, the detecting lens detects the face of the user to obtain continuously face images, and then two face images continuously obtained are compared to determine whether the photographing lens photographs the target or not.

An example is given below for description. When the user intends to photograph a target, the target is focused on through the photographing lens of the camera (Step 200). Then, the face of the user is detected through the detecting lens (Step 100), so as to obtain continuously the face images of the user (Step 110). When the facial expression of the user varies, the obtained face image also changes, such that the camera may capture the image variance by comparing the difference on the pixel units of the two face images before and after the variation (Step 120). Finally, when it is determined that the image variance exceeds a preset photographing starting value, the target is photographed through the photographing lens (Step 130).

Here, the focusing step can be accomplished through pressing a key of the camera, such as, not limited, shutter key or other special key, to actuate the photographing lens to focus on the target, or automatically actuating the photographing lens to focus on the target.

Figure 3:
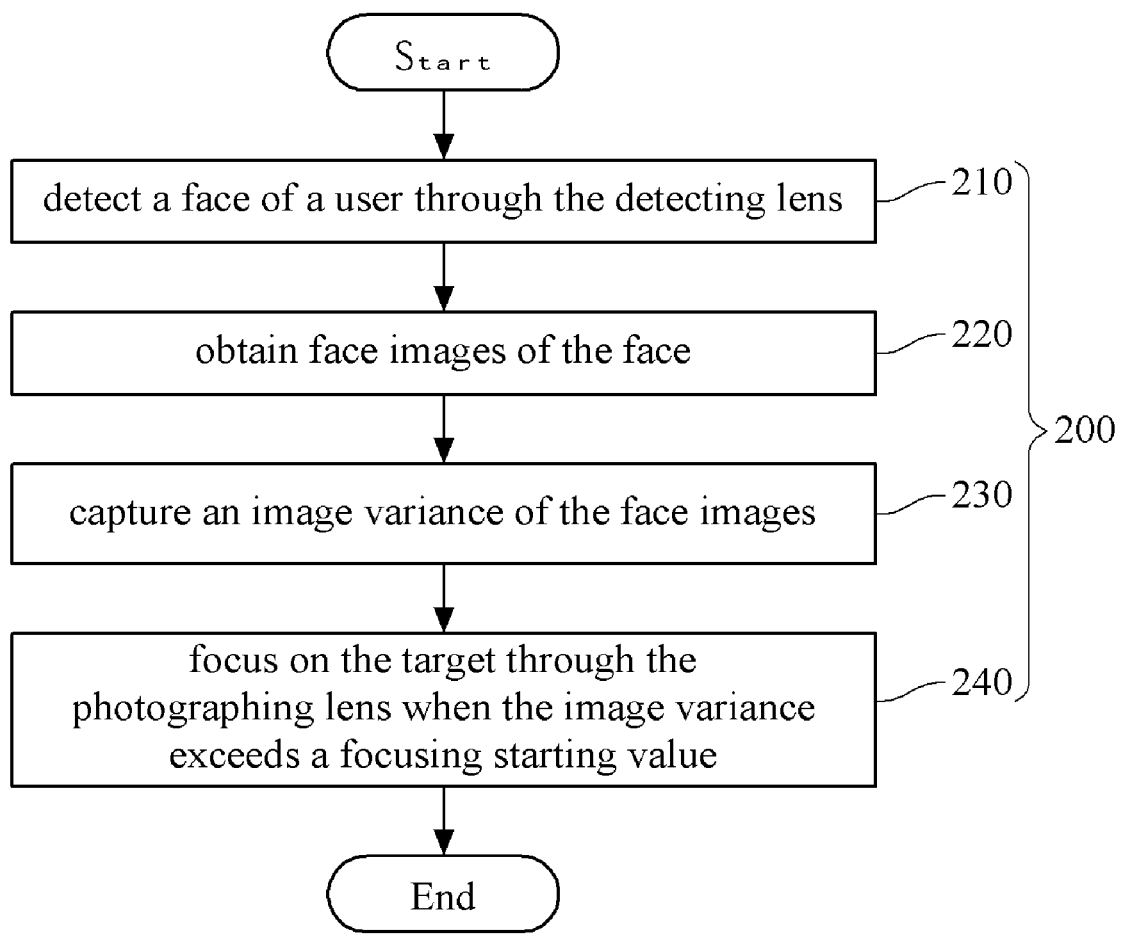
FIG. 3 is a flow chart of an automatic photographing method with face recognition according to an embodiment of the present invention.

Furthermore, the focusing step can be accomplished through the facial expression variation of the user. Referring to FIG. 3, a flow chart of an automatic photographing method with face recognition according to an embodiment of the present invention is shown.

In FIG. 3, during focusing the target, the face of the user is detected through the detecting lens (Step 210), and then the face images of the face are continuously obtained (Step 220). Next, the image variance of the face images continuously obtained is captured (Step 230), and finally the target is focused on through the photographing lens when the image variance exceeds a focusing starting value preset (Step 240).

In this embodiment, the face of the user is detected through the detecting lens to continuously obtained face images of the user, and then the image variation of the face images of the user is obtained. Finally, the target is focused on through the photographing lens according to the image variation.

An example is given below for description. When the user intends to focus on a target, the face of the user is detected through the detecting lens (Step 210), so as to continuously obtain the face images of the user (Step 220). When the facial expression of the user varies, the face images continuously obtained changes. That is, the camera can compare the pixel units of the two face images before and after change to capture the image variance between the two face images continuously obtained (Step 230). Finally, when the image variance exceeds the preset focusing starting value, the target is focused on through the photographing lens (Step 240).

Besides, the focusing step can be exceeded before photographing the target.

In other words, the detecting lens can detect the face of the user to continuously obtain the face images of the user, hereafter called as a first face image, a second face image and a third face image in order. The image variance captured through comparing two face images continuously obtain, i.e. comparing the first face image with the second face image, is used to compare with the preset focusing starting value. Then, the camera enables the photographing lens to focus the target when the image variance exceeds the preset focusing starting value. That is, after achieving focusing the target, another image variance obtained through continuously comparing two face images, i.e. comparing the second face image with the third face image, is used to compare with the preset photographing starting value. Then, the camera enables the photographing lens to photograph the target when the image variance exceeds the preset photographing starting value.

Figure 4:
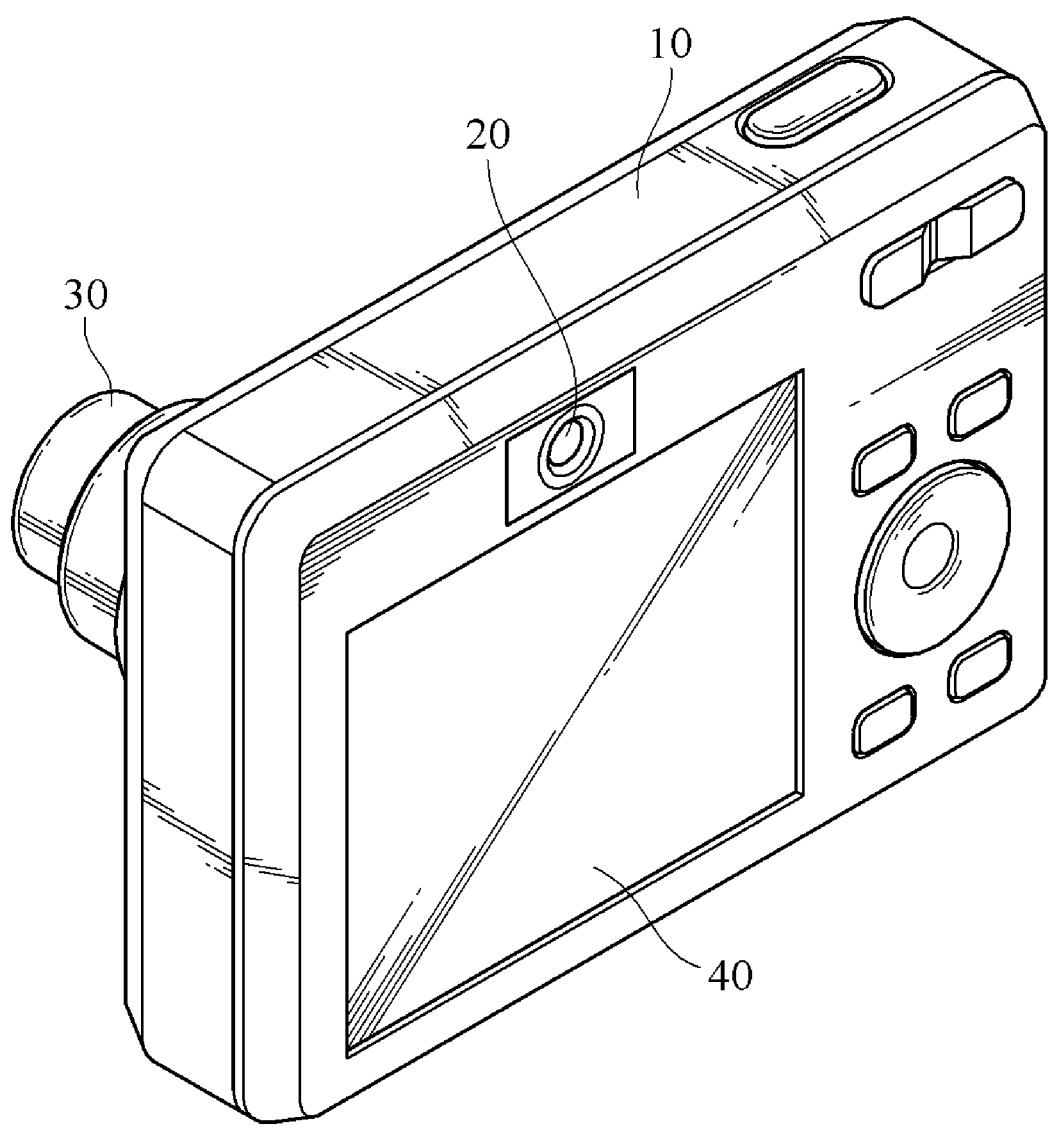
FIG. 4 is a schematic view of an automatic photographing device with face recognition according to an embodiment of the present invention.

An example is given below for description with an automatic photographing device with face recognition. FIG. 4 is a schematic view of an automatic photographing device with face recognition according to an embodiment of the present invention. Referring to FIG. 4, the device includes a body 10, a detecting lens 20, a photographing lens 30, and a screen 40.

In this embodiment, the face of the user is detected through the detecting lens 20 to continuously obtain two face images of the user, the image variation of the face images of the user is obtained, and the target is focused on through the photographing lens 30 according to the image variation. After that, the face of the user is again detected through the detecting lens 20 to continuously obtain two face images of the user, the image variation of the face images of the user is obtained, and finally the target is photographed through the photographing lens 30 according to the image variation.

When the user intends to photograph a target, the target is focused on through the photographing lens 30 of the automatic photographing device with face recognition, and the target is displayed in the center of the screen 40. Then, the face of the user is detected through the detecting lens 20 (Step 210), so as to obtain the face images of the user (Step 220). Next, when the facial expression of the user varies, the obtained face images also change. That is, the camera may capture the image variance by comparing the difference on the pixel units of the two face images before and after the change (Step 230). When it is determined that the image variance exceeds a preset focusing starting value, the target is focused on through the photographing lens 30 (Step 240). Then, the face of the user is again detected through the detecting lens 20 (Step 100), so as to obtain the face images of the user (Step 110). Afterward, when the facial expression of the user varies, the obtained face image also changes, that is, the camera may capture the image variance by comparing the difference on the pixel units of the two face images before and after the image variation (Step 120). Finally, when it is determined that the image variance exceeds a preset photographing starting value, the target is photographed through the photographing lens 30 (Step 130).

The photographing lens 30 and the detecting lens 20 may be selected from the same or different kinds of lenses. For example, the photographing lens 30 may be a charge coupled device (CCD) lens with good photographing quality, and the detecting lens 20 may be a complementary metal-oxide semiconductor (CMOS) lens with a low price, so as to reduce the manufacturing cost of the camera. In addition, the above description is merely exemplary.

In view of the above, in the present invention, the target is focused on through the photographing lens, the face of the user is detected through the detecting lens to obtain the face image, then the image variance is captured according to the face image, and finally when the image variance exceeds the photographing starting value, the target is photographed through the photographing lens. Therefore, during the whole process, it is possible to finish photographing through image variation of the face images of the user without pressing any key to actuate photographing, so as to completely prevent handshakes resulted from the pressing action, and thus improve the photographing quality.

What is claimed is:

1. An automatic photographing method with face recognition, applied in a camera having a detecting lens and a photographing lens for a user to photograph a target, the method comprising:
   detecting a face of the target through the detecting lens;
   obtaining a plurality of face images of the detected face;
   capturing a first image variance by comparing the obtained face images;
   focusing on the target through the photographing lens, which is performed detecting the face of the target, wherein focusing on the target through the photographing lens includes:
      detecting the face through the detecting lens to obtain a plurality of other face images of the detected face;
      capturing a second image variance by comparing the other face images after obtaining the other face images; and
      actuating the photographing lens to focus on the target; and
   photographing the target through the photographing lens when the captured first image variance exceeds a photographing starting value.

2. The automatic photographing method with face recognition according to claim 1, wherein the step of actuating the photographing lens is performed automatically or by pressing a key of the camera.

3. The automatic photographing method with face recognition according to claim 1, wherein the step of actuating the photographing lens to focus on the target is performed when the second image variance exceeds a focusing starting value.

4. The automatic photographing method with face recognition according to claim 1, wherein the step of obtaining the other face images comprises:
   obtaining a plurality of pixel units of the other face images of the detected face.

5. The automatic photographing method with face recognition according to claim 4, wherein the second image variance is generated by comparing pixel units of the obtained other face images.

6. The automatic photographing method with face recognition according to claim 5, wherein the step of obtaining the face images comprises:
   obtaining a plurality of pixel units of the face images; and
   the step of capturing the first image variance comprising:
   comparing the pixel units of the obtained face images.

7. The automatic photographing method with face recognition according to claim 1, wherein the step of focusing on the target is performed after detecting the face to obtain the face images.

8. The automatic photographing method with face recognition according to claim 7, wherein the step of focusing on the target comprises:
   comparing a first group of the obtained face images to generate a second image variance; and
   actuating the photographing lens to focus on the target when the second image variance exceeds a focusing starting value; and
   the step of capturing the first image variance comprises:
   comparing a second group of the obtained face images to generate the first image variance.

9. The automatic photographing method with face recognition according to claim 8, wherein the face images comprise a first face image, a second face image and a third face image, the first image variance is generated by comparing the first and second face images, and the second image variance is generated by comparing the second and third face images.

10. The automatic photographing method with face recognition according to claim 8, wherein the face images comprise a first face image, a second face image, a third face image and a fourth face image, the first image variance is generated by comparing the first and second face images, and the second image variance is generated by comparing the third and fourth face images.

11. The automatic photographing method with face recognition according to claim 8, wherein each face image comprises a plurality of pixel units, the first image variance is generated by comparing the pixel units of the second group of the face images, and the second image variance is generated by comparing the pixel units of the first group of the face images.

12. The automatic photographing method with face recognition according to claim 8, wherein the step of actuating the photographing lens to focus on the target is performed automatically or by pressing a key of the camera.

* * * * *